or Firm—Robert A. Harman

United States Patent [19]
Aharoni et al.

[11] 4,232,951
[45] Nov. 11, 1980

[54] MESOMORPHIC ISOCYANATE EXTENDED RIGID POLYMERS

[75] Inventors: Shaul M. Aharoni, Morris Plains; John P. Sibilia, Livingston; Deborah R. Kozlowski, Morristown, all of N.J.

[73] Assignee: Allied Chemical Corporation, Morris Township, Morris County, N.J.

[21] Appl. No.: 931,211

[22] Filed: Aug. 4, 1978

[51] Int. Cl.$^3$ .......................... C09K 3/34; G02F 1/13
[52] U.S. Cl. ................ 350/350 R; 252/299; 252/408; 73/356; 73/358; 350/351; 528/67
[58] Field of Search .......... 350/350, 347, 351, 350 R, 350/347 E; 252/299; 73/356, 358

[56] References Cited

U.S. PATENT DOCUMENTS

| | | | |
|---|---|---|---|
| 3,355,513 | 11/1967 | Sadron et al. | 252/408 |
| 3,795,436 | 3/1974 | Boller et al. | 252/299 |
| 3,796,479 | 3/1974 | Helfrich et al. | 252/299 |
| 3,935,337 | 1/1976 | Taylor | 252/299 |

OTHER PUBLICATIONS

Bur, A. J., et al., Chem. Rev., vol. 76, pp. 727–746, (1976).
Millich, F., Adv. Polymer Sci., vol. 19, pp. 117–140 (1975).
Tiger, R. P., et al., Russ. Chem. Rev., vol. 41, No. 9, pp. 774–785 (1972).
Derger, M. N., Macromol. Sci-Revs. Macromol. Chem., C9 (2), pp. 269–303 (1973).
Shashoua, V. E., et al., J. Am. Chem. Soc., vol. 82, pp. 866–873 (1960).
Ambler, M. R., et al., Macromolecules, vol. 11 (2), pp. 300–306 (1978).
Morgan, P. W., Macromolecules, vol. 10, No. 6, pp. 1381–1396 (1977).
Blair, T. I., et al., Macromolecules, vol. 10, No. 6, pp. 1396–1406, (1977).
Gray, G. W., et al., Liquid Crystals & Plastic Crystals, vol. 1, John Wiley & Sons, Inc., N.Y., pp. 175–198, 327–355 (1974).

Primary Examiner—Teddy S. Gron
Attorney, Agent, or Firm—Robert A. Harman

[57] ABSTRACT

Mesomorphic polyisocyanate compositions are described having extended rigid polymer backbones with flexible pendant groups. The compositions exhibit liquid-crystalline behavior and are useful in a device and process for displaying indicia, performing memory functions or indicating temperature. Novel polyisocyanate compositions for use in the above device and process are also described.

8 Claims, No Drawings

MESOMORPHIC ISOCYANATE EXTENDED RIGID POLYMERS

BACKGROUND OF THE INVENTION

1. Field of the Invention

This invention relates to mesomorphic polyisocyanate compositions and their use in a liquid-crystal containing structure in a device and process for displaying indicia, performing memory functions or indicating temperature.

2. Brief Description of the Prior Art

Mesomorphic materials, also known as liquid-crystalline materials, are organic compounds which can exist in a transition state, i.e. a mesomorphic state, of physical structure between normal crystalline solid and isotropic liquid forms.

It is known in the prior art as described in U.S. Pat. No. 3,935,337 (1976) to use liquid-crystalline materials in electronic display or memory devices. Such devices typically comprise a thin layer of liquid-crystals sandwiched between two sheets of glass. Normally, the thin layer of liquid-crystal material is clear, but under the application of an electric field or heat, some regions of the material become turbulent so as to scatter light. By controlling the size and shape of the turbulent regions, images can be formed as a result of the light scattering. Primarily, this effect is obtained by use of liquid crystal materials of the nematic type. By the term "nematic" is meant a particular mesomorphic state, which is the first state formed upon cooling from a liquid melt and in which the orientation of the molecules is in parallel line but not layers.

Materials exhibiting liquid-crystalline behavior are well known in the prior art, and are generally divisible into three categories: (1) relatively stiff elongated molecules, non-polymeric in nature, such as 4,4'-azoxyanisole (2) polymeric liquid crystals whose pendant groups (side chains) are mesogenic in nature and whose backbone is flexible in nature, such as poly[di(N-p-acryloyloxybenzylidene)-p-diaminobenzene] and (3) aromatic, rigid and pendantless polymers such as polyamides or polyesters, such as poly(1,4-phenylene terephthalamide) as a concentrated solution in sulfuric acid. By the term "mesogenic", as used herein, is meant materials which can exist in mesomorphic modification.

It is generally accepted that the combination of geometrical shape and molecular polarity are the parameters most responsible for inducing liquid-crystalline behavior.

Polymers, with liquid crystal side groups, as described above, are either polyacrylic (polyacrylates, polymethacrylates and their copolymers) or polyvinyl (polystyrene) in nature. See S. B. Clough, A. Blumstein and E. C. Hsu, *Macromolecules* 9, 123 (1976); V. N. Tsvetkov et al., *Europ. Polymer J.* 9, 481 (1973); L. Strzelecky and L. Liebert, *Bull. Soc. Chim. France* (1973), p. 597. In all of the above polymers, the backbones are flexible and do not impart directionality to the pendant residues. Pendant groups on the polymers are usually chosen from among monomeric species that by themselves exhibit liquid-crystalline behavior, or are mesogenic in nature. Upon polymerization, these pendant groups tend to align themselves in an ordered fashion to cooperatively act as liquid crystals. The spatial positioning of such cooperative regions is not controlled by the polymeric backbone, due to the flexibility of the latter, except for having the pendant groups at fixed distances from the meandering, flexible backbone. Directionality and cooperative phenomena, if they exist in such systems, are due solely to the inherent properties of the monomeric species and are independent from the random path of the flexible backbone chain.

In the continuing search for materials exhibiting liquid crystalline behavior, what is desired in the art is a class of materials in which the variables affecting desirable liquid-crystal behavior can be conveniently and predictably monitored and "tailored" for respective end uses. Particularly in a polymeric system, what is desired is a rigid and extended polymeric backbone (albeit not necessarily as a rigid rod), in which the positions of selected pendant groups can be spatially fixed relative to one another, along the same chain. The pendant groups should be flexible or partly flexible in nature, and exhibit neither mesomorphic nor mesogenic behavior in the monomeric state, such that the primary parameter controlling liquid-crystalline behavior is the structural combination of the extended rigid polymer backbone with attached pendant groups.

Two examples of polyisocyanides, exhibiting liquid-crystalline behavior are poly(alpha-phenethyl isocyanide) and poly(beta-phenethyl isocyanide) as described in *Adv. Polymer Sci.*, 19, 117 (1975). None of the other members of this class of polymers is reported to exhibit mesomorphic behavior. However, in view of the toxicity and health hazards associated with the above materials, their utility in commercially acceptable devices is probably severely limited.

Polyisocyanates are a known class of polymers and methods of preparation, physical and chemical properties thereof are described for example, in the references; *Russian Chemical Reviews*, Vol. 41(a) pp. 774–785 (1972); *Macromol. Sci.-Revs. Macromol. Chem.* C9 (2) pp. 269–303 (1973); and *J. Am. Chem. Soc.* 82, pp. 866–873 (1960). The reference, *Macromolecules*, Vol. 11, pp. 300–306 (1978) describes solution properties of poly(n-butyl isocyanate). The synthesis and properties of aromatic and extended chain polyamides is described in *Macromolecules*, Vol. 10, pp. 1381–1390 (1977). However, in none of the above references, are liquid-crystalline properties of polyisocyanates described.

SUMMARY OF THE INVENTION

We have unexpectedly found that certain classes of polyisocyanates, homopolymers or copolymers thereof, exhibit mesomorphic behavior which is useful in a liquid-crystal containing structure in a device and process for displaying indicia or performing memory functions. The polyisocyanates are characterized as having a fairly rigid backbone to which are attached flexible pendant groups in which the mesomorphic nature can be suitably controlled.

In accordance with this invention there is provided in a device for displaying indicia, performing memory functions or indicating temperature including a liquid-crystal containing structure, a heat source or electrical field source, attached to said structure, wherein under the influence of applied heat or an electrical field on contact from said sources with said structure, the liquid-crystalline behavior of said liquid-crystal is induced, said behavior resulting in the displaying of indicia, performing of memory functions, or indicating temperature and a means for observing said behavior; the improvement which comprises said liquid-crystal comprising a polyisocyanate homopolymer or copolymer.

Preferred polyisocyanates for use in the device are wherein said homopolymer is derived by polymerizing an isocyanate of the formulae:

R—NCO, wherein R is (1) linear $C_4$ or linear or branched $C_5$-$C_{12}$ alkyl, or substituted alkyl;

(2) linear $C_4$ or linear or branched $C_5$-$C_{12}$ terminal alkenyl, or substituted terminal alkenyl; said copolymer derived by copolymerizing a mixture of isocyanates of formulae (1) or (2), or mixtures thereof, or an admixture of isocyanates of formulae (1) or (2) or mixtures thereof, with at least one isocyanate of the formula:

(3) Ar—$(CH_2)_n$—NCO, wherein Ar is phenyl or substituted phenyl and n is an integer value of 3 to 5; or an admixture of at least one isocyanate of formulae (1), (2) or (3), or mixtures thereof, with at least one isocyanate of the formula:

(4) R—NCO, wherein R is linear $C_1$-$C_3$ alkyl or substituted alkyl; said substituents on R and Ar being inert under the polymerization conditions and not adversely affecting the liquid-crystalline behavior of said polyisocyanate and said molar ratio of Ar-containing isocyanate to R-containing isocyanate, in said copolymers thereof, being about 4:1 to 1:3.

Also provided is a process for displaying indicia, performing memory functions or indicating temperature, including (a) applying heat or an electrical field to a liquid-crystal containing structure to induce liquid-crystalline behavior in said liquid crystal; and (b) observing said behavior; the improvement which comprises providing a polyisocyanate homopolymer or copolymer, as the liquid crystal. Preferred polyisocyanates useful in the process are the same as those described above, useful in the improved device of this invention.

Further provided is a composition comprising a polyisocyanate, exhibiting liquid-crystalline behavior, derived by copolymerizing an isocyanate of the formula:

Ar—$(CH_2)_n$—NCO, wherein Ar is phenyl or substituted phenyl, and n is an integer value of 3 to 5, with an isocyanate of the formula:

R—NCO, wherein R is:

(1) linear $C_1$-$C_4$ or linear or branched $C_5$-$C_{12}$ alkyl, or substituted alkyl; or (2) linear $C_4$ or linear or branched $C_5$-$C_{12}$ terminal alkenyl, or substituted terminal alkenyl, or mixtures thereof, said substituents on R and Ar being inert under the polymerization conditions and not adversely affecting the liquid-crystalline behavior of said polyisocyanate and said molar ratio of Ar-containing isocyanate to R-containing isocyanate being about 4:1 to 1:3 in said copolymer.

DESCRIPTION OF THE INVENTION AND PREFERRED EMBODIMENTS

The improved device and improved process of this invention both utilize polyisocyanates or homopolymers or copolymers thereof exhibiting liquid-crystalline behavior. The polyisocyanate homopolymers in general have the structure:

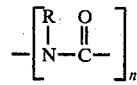

wherein n is a number corresponding to the number of repeating units and is generally in the range from about 100 to 10,000, although not restricted thereto, and R is an organic flexible radical which results in the polyisocyanate exhibiting liquid-crystalline behavior. In general, the weight average molecular weight, $M_w$, of the polyisocyanate is about $10^4$ to $10^6$, although not restricted thereto, as determined by conventional light scattering measurements. The polyamide backbone structure of the polymer is described as being fairly rigid and extended, as is evidenced by solution properties, nuclear magnetic resonance and infrared spectral evidence, and is actually a nylon-1 type polymer in structure. The homopolymers in general exhibit $\eta_{sp}/C$ reduced viscosity values of about 0.15 to 12 deciliters/gram as measured by conventional techniques in 0.5% weight/volume solutions in chloroform at room temperature, and a preferred range is about 2 to 12 deciliters/gram viscosity units. The R radicals in the liquid-crystalline polyisocyanate are pendant groups attached to the nitrogen atom in the backbone of the polymer and are flexible and capable of rotational movement resulting in the observed liquid-crystal properties. The R groups in the polyisocyanate are not mesomorphic or mesogenic in themselves, as evidenced by the fact that the isocyanate monomers are not mesomorphic. Due to the rigidity of the polyamide backbone, the pendant R groups are able to align themselves in cooperative spatial arrangements with their neighbors which results in the novel liquid-crystalline behavior as observed. The parameters of the R groups responsible for imparting liquid-crystalline behavior to the rigid backbone polymer are their size, flexibility, steric and spatial considerations.

Preferred homopolymers of polyisocyanates useful in this invention include polyisocyanates formed by polymerizing isocyanates of formula (1), described in the Summary of the Invention, wherein R is linear or branched $C_5$-$C_{12}$ alkyl, or substituted alkyl. Formation of the polyisocyanate homopolymers and copolymers is usually accomplished by known anionic polymerization methods. By the term "substituted alkyl" is meant one or more substituents present on the alkyl chain which do not adversely affect the liquid-crystalline behavior of the polyisocyanate composition and which are inert during the polymerization of the isocyanate regardless of the polymerization method chosen. Representative examples of suitable substituents include halogen, such as fluorine, chlorine, bromine, and iodine; linear $C_1$-$C_4$ linear alkoxy including methoxy, ethoxy and n-butoxy; phenoxy and substituted phenoxy, said substituents conforming to the requirements stated above; and linear $C_1$-$C_4$ alkyl carboxylic esters, such as ethoxycarbonyl. Representative examples of R groups include n-butyl, n-pentyl, n-hexyl, n-octyl, isooctyl, n-nonyl, n-decyl, n-undecyl, n-dodecyl, and substituted derivatives thereof, as defined above. Particularly preferred R groups in this category are linear alkyl from n-hexyl through n-decyl.

Other preferred isocyanate homopolymers also useful in the instant invention include those formed from polymerizing isocyanates of the formula (2), described above in The Summary of The Invention, wherein R is linear $C_4$ or linear or branched $C_5$-$C_{12}$ terminal alkenyl, or substituted terminal alkenyl. By the term "terminal alkenyl" is meant that the double bond of the alkenyl group is positioned between the penultimate and terminal carbons of the alkenyl chain. By the term "substituted terminal alkenyl" is meant that the substituents, as described above, may be present which do not adversely affect the liquid-crystalline behavior of the polyisocyanate composition and are inert during the polymerization process in forming the polyisocyanate. Representative examples of suitable substituents include those described above. Representative examples of terminal alkenyl groups as R include 3-n-butenyl, 4-n-pentenyl, 5-n-hexenyl, 7-n-octenyl, 9-n-decenyl, 11-n-dodecylenyl and substituted derivatives thereof, as defined above. Particularly preferred terminal alkenyl group is 9-n-decylenyl.

Copolymers of polyisocyanates are also useful in the instant invention and in general have the structure described above for the homopolymer with the exception that two or more different R groups as defined herein are present on the polymer chain either in a block, alternating or random manner. In general, the copolymers are thought to exist in a random distribution. The weight average molecular weight, $M_w$, number of repeating units n for the copolymer, and the specific viscosity values, are the same as described for the homopolymers above.

Copolymers useful in the invention include those produced by polymerizing a mixture of at least two isocyanate monomers of formula (1), which are described above. A preferred copolymer in this category is one formed from copolymerizing a mixture of nonyl and butyl isocyanates, and particularly preferred is a copolymer formed from a 1:1 molar ratio of said isocyanates.

Useful copolymers in the invention also include those formed by polymerizing a mixture of at least two isocyanate monomers of formula (2) which are described above. A preferred copolymer in this category is one formed by copolymerizing a mixture of 4-n-pentenyl and 9-n-decenyl isocyanates and particularly preferred is a copolymer formed from a 1:1 molar ratio of said isocyanates.

Further copolymers useful in the instant invention are those formed by copolymerizing a mixture of at least one isocyanate monomer of formula (1) with at least one isocyanate monomer of formula (2). A preferred example in this category is a polyisocyanate formed by copolymerizing a mixture of n-butyl and 9-n-decenyl isocyanates particularly in a 1:1 molar ratio.

Copolymers which are also useful in the instant invention can be formed by copolymerizing an admixture of at least one isocyanate of formula (1) or (2), or mixture thereof, with at least one aralkyl isocyanate of formula (3), Ar—$(CH_2)_n$—NCO, where Ar is phenyl or substituted phenyl and n is an integer value of 3 to 5, wherein the molar ratio of Ar-containing isocyanate to R-containing isocyanate, in the copolymer is about 4:1 to 1:3. A limitation in the structure of the aralkyl isocyanate is that the Ar radical must be positioned on at least the third carbon of the alkyl chain of the isocyanate, or further removed, in order to obtain liquid-crystalline behavior. Preferred molar ratios are about 1:1. By the term "substituted phenyl" is meant the phenyl ring contains one or more substituents, said substituents not adversely affecting the liquid-crystalline behavior of formed polyisocyanate and being inert during the polymerization process for forming said polyisocyanate. Representative examples of substituents include halogen, such as fluorine, chlorine, bromine or iodine; linear $C_1$-$C_4$ alkoxy, including methoxy, ethoxy, n-propoxy and n-butoxy; phenoxy and substituted phenoxy, said substituents conforming to the requirements stated above; and linear $C_1$-$C_4$ alkyl carboxylic esters such as ethoxycarbonyl. Representative examples of aralkyl isocyanates suitable for use in the invention include 3-phenylpropyl, 3-(p-methoxy)phenylpropyl, 4-(p-methoxy)phenylbutyl, 5-phenylpentyl, and 3-(p-methoxy)phenylpropyl isocyanates. Particularly preferred aralkyl isocyanates are 3-phenylpropyl and 3-(p-methoxy)phenylpropyl isocyanate.

Examples of copolymers formed from aralkyl isocyanates and isocyanates of formula (1) are: 3-(p-methoxy)phenylpropyl isocyanate/n-butyl isocyanate; and 3-phenylpropyl isocyanate/n-butyl isocyanate. Examples of copolymers formed from aralkyl isocyanates and isocyanates of formula (2) are: 3-(p-methoxy)phenylpropyl isocyanate/9-n-decenyl isocyanate; and 3-phenylpropyl isocyanate/4-n-pentenyl isocyanate. Examples of copolymers formed from aralkyl isocyanates and mixtures of isocyanates of formulas (1) and (2) are 3-(p-methoxy)phenylpropyl isocyanate/n-butyl isocyanate/9-n-decenyl isocyanate; and 3-phenylpropyl isocyanate/n-hexyl isocyanate/4-n-pentenyl isocyanate. Particularly preferred are the above copolymers formed from 1:1, 1:1:1 or 1:1:1:1 molar ratios by the use of two, three or four isocyanate monomers, respectively.

Copolymers which are also useful in the instant invention include those formed from an admixture of at least one isocyanate of formulae (1), (2) or (3), described above, with an isocyanate of the formula (4), R—NCO, wherein R is linear $C_1$-$C_3$ alkyl, or substituted alkyl. By the term "substituted alkyl" is meant the same definition used for the term as described above for formula (1). Representative R groups in this category of isocyanates include methyl, ethyl and n-propyl. Representative examples of copolymers formed in this category are 3-phenylpropyl isocyanate/n-propyl isocyanate; 3-phenylpropyl isocyanate/methyl isocyanate; 3-(p-methoxy)phenylpropyl isocyanate/n-propyl isocyanate; nonyl isocyanate/ethyl isocyanate; 3-(p-methoxy)phenylpropyl isocyanate/ethyl isocyanate; 9-n-decenyl isocyanate/ethyl isocyanate; nonyl isocyanate/9-n-decenyl isocyanate/ethyl isocyanate; and 3-phenylpropyl isocyanate/nonyl isocyanate/9-n-decenyl isocyanate/ethyl isocyanate. Particularly preferred are the above copolymers formed from 1:1, 1:1:1, or 1:1:1:1 molar ratios by the use of two, three or four isocyanate monomers, respectively.

In all of the above copolymers containing Ar-containing isocyanate, the molar ratio of Ar-containing isocyanate to R-containing isocyanate is about 4:1 to 1:3 therein. Preferred copolymers in this category contain about a 1:1 molar ratio of Ar-containing isocyanate to R-containing isocyanate. It is to be understood that the terms, Ar- and R-containing isocyanates, as used herein, may be a single compound or mixture of isocyanates.

A novel class of polyisocyanate copolymer compositions is also a subject of this invention and comprises a polyisocyanate, exhibiting liquid-crystalline behavior, derived by copolymerizing an isocyanate of the formula: Ar—(CH$_2$)$_n$—NCO, wherein Ar is phenyl, or substituted phenyl, and n is an integer value of 3 to 5, with an isocyanate of the formula: R—NCO, wherein R is (1) linear C$_1$-C$_4$ or linear or branched C$_5$-C$_{12}$ alkyl, or substituted alkyl; or (2) linear C$_4$ or linear or branched C$_5$-C$_{12}$ terminal alkenyl, or substituted terminal alkenyl, or mixtures thereof, said substituents on R and Ar being inert under the polymerization conditions and not adversely affecting the liquid-crystalline behavior of said polyisocyanate and said molar ratio of Ar-containing isocyanate to R-containing isocyanate being about 4:1 to 1:3 in said copolymer.

The individual classes of isocyanate monomers used in forming the novel Ar-containing copolymers described above have already been described hereinabove including a discussion of the nature and type of substituents suitable for use in the copolymer.

Specific examples of novel copolymers of this invention include 3-phenylpropyl isocyanate/n-butyl isocyanate, 3-phenylpropyl isocyanate/ n-propyl isocyanate, 3-phenylpropyl isocyanate/methyl isocyanate, 3-(p-methoxy)phenylpropyl isocyanate/n-butyl isocyanate, 3-(pmethoxy)phenylpropyl isocyanate/n-propyl isocyanate, and 3-(p-methoxy)phenylpropyl isocyanate/-methyl isocyanate.

The following table lists homopolymers and copolymers, formed from the corresponding listed monomeric isocyanates, which were found not to exhibit liquid-crystalline behavior.

TABLE

| Homopolymer | Copolymer formed with |
|---|---|
| Methyl isocyanate | Ethyl isocyanate |
| Ethyl isocyanate | |
| n-Propyl isocyanate | |
| Isopropyl isocyanate | |
| Octadecyl isocyanate | |
| Pentadecyl isocyanate | |
| Tridecyl isocyanate | |
| Phenyl isocyanate | n-Butyl isocyanate |
| Tolyl isocyanate | n-Butyl isocyanate |
| Benzyl isocyanate | n-Butyl isocyanate |
| 3-Phenylpropyl isocyanate | n-Butyl isocyanate |
| 2-(p-Methoxy)phenylethyl isocyanate | n-Butyl isocyanate |
| (p-Methoxy)phenyl isocyanate | or with one another |
| (p-Methoxy)benzyl isocyanate | |
| 3-(p-Methoxy)phenylpropyl isocyanate | |
| 2-Phenethyl isocyanate | n-Butyl isocyanate |
| Cyclohexyl$^a$ isocyanate | n-Butyl isocyanate |
| Cyclohexyl methyl$^a$ isocyanate | n-Butyl isocyanate |

$^a$Failed to homopolymerize under conditions of Procedures B and C.

The liquid-crystalline behavior of the polyisocyanates of this invention can be readily observed in the neat form (solid) or in concentrated solution. In the neat form, the liquid-crystalline properties are observed by means of hot stage microscopy, utilizing a hot stage microscope wherein the solid is examined under a microscope with the aid of polarized light during which the temperature of the sample is increased. For liquid-crystalline materials, as the temperature is increased, the mesomorphic transition temperature range, i.e. the temperature at which the material exhibits mesomorphic behavior, is reached and liquid-crystalline behavior, is observed. At this temperature, polarized light, infringing upon the sample, which contains "spherulites", is cancelled by the analyzer and the individual spherulites appear to be marked by "Maltese Crosses." These spherulites are liquid, as is evidenced by their ability to flow and deform under applied pressure and shear. The appearance of "Maltese Crosses" under polarized light, coupled with dramatic visual changes which occur throughout the mesomorphic transition temperature range due to localized changes in the refractive index, a phenomenon called birefrigence, is further evidence of the liquid-crystalline behavior. In general, the mesomorphic temperature for polyisocyanates in the neat form occurs within the range, bracketed from below by about 50° C. up to about 5° C. below the melting point of the polyisocyanate composition and from above by the melting point of said composition. Upon heating above this temperature, the melting point of the polymer is surpassed thereby obtaining an isotropic melt. Generally, this mesomorphic temperature will be displayed by the polyisocyanates of this invention in the temperature range from about room temperature to about +190° C.

The transition from the crystalline solid state to the mesomorphic state for the liquid-crystalline polyisocyanate compositions useful in this invention is reversible. Thus, the utility of the device for displaying indicia, performing memory functions and indicating temperature is greatly enhanced contributing to the longevity and performance of such a device.

X-ray diffraction patterns of the solid and mesomorphic states indicate a minor change in the crystalline structure in proceeding from the crystalline state to the mesomorphic state. The mesomorphic state of the polyisocyanate, as characterized by X-ray diffraction, can be explained as consisting of a parallel array of chains, highly ordered with respect to one another.

Polyisocyanates in concentrated solution also exhibit liquid-crystalline behavior. By the term "concentrated" as herein used is meant the increase in concentration of a polyisocyanate in solution above that concentration wherein the solution no longer displays isotropic properties but displays anisotropic properties and thus liquid-crystalline behavior. The point in concentration wherein anisotropic period properties begins to occur is termed the "anisotropic concentration minimum". A small amount of polyisocyanate in dilute solution will in general, behave as an isotropic solution, i.e. it will transmit light equally in all directions. By increasing the concentration, a certain concentration will be reached wherein the solution will display anisotropic properties, i.e. the solution will transmit light unequally in all directions. The reason underlying this effect is not clearly understood but may be due to the inability of the rigid chains to orient themselves in an ordered fashion in dilute solution below the anisotropic concentration minimum, but possessing this ability above said concentration minimum. In general, a solution of polyisocyanate, in a solvent therefor, will exhibit liquid-crystalline behavior above the anisotropic concentration minimum when the concentration is above about 5 weight percent and up to about 35 weight percent of polyisocyanate in solution. Concentrations above this value tend to behave as gels.

The use of liquid-crystalline polyisocyanate compositions in the device and process of this invention is greatly enhanced by use of the polyisocyanate either in the neat or concentrated solution forms. The mesomorphic transition temperature range for a given polyisocyanate composition can be "tailored" to conform to a required end-use temperature by choice of either the neat or concentrated solution forms. For example, n-hexyl isocyanate homopolymer exhibits a mesomorphic transition temperature neat at about 172° to 180° C.; whereas in a 15 weight percent solution in 1,1,2,2-tetrachloroethane (TCE), the polyisocyanate exhibits a mesomorphic transition temperature range at about room temperature.

Further, the mesomorphic transition temperature range of polyisocyanate copolymers can be tailored by suitable choice of the molar ratios of component isocyanate monomers in the copolymerization. For example, a copolymer formed from a 1:1 molar ratio of 3-(p-methoxy)phenylpropyl isocyanate to n-butyl isocyanate exhibits a mesomorphic transition temperature initially at 165° C.; whereas a copolymer formed from a 3:1 molar ratio, respectively, of the same isocyanate monomers, exhibits a mesomorphic transition temperature range beginning at 175° C. Both copolymers exhibit liquid-crystalline behavior at room temperature in 10 weight percent solutions of TCE.

Use of either the neat or solution form of a polyisocyanate homopolymer, or neat or solution form of copolymer in different molar ratios, allows a broad range of desired end use temperatures to be used in the device or process of this invention, or to be indicated or monitored.

Solvents for polyisocyanates useful in this invention are those which are good solvents toward the polyisocyanate described in this invention and do not adversely affect the liquid-crystalline behavior said polyisocyanate in solution and include $C_6$–$C_{10}$ aromatic hydrocarbons, halogen $C_1$–$C_4$ saturated paraffinic hydrocarbons, $C_4$–$C_6$ cyclic saturated paraffinic hydrocarbons or mixtures thereof. Representative examples of solvents include benzene, toluene, chloroform, bromoform, 1,1,2,2-tetrachloroethane, tetrahydrofuran or mixtures thereof. A preferred solvent is 1,1,2,2-tetrachloroethane (TCE).

Preferred polyisocyanate solutions for use in the improved device and process of this invention are about 30 weight percent solutions of butyl, hexyl, or octyl isocyanates, or copolymers formed with each other, preferably in a 1:1 molar ratio, in 1,1,2,2-tetrachloroethane solvent.

Synthesis of the isocyanate monomers used to prepare the polyisocyanates useful in this invention are well known in the art. For example, the isocyanate may be prepared from the corresponding acid, containing a like number of carbon atoms by (1) conversion of the acid to an acid chloride; (2) conversion of the acid chloride to an azide; and (3) conversion of the azide via a Curtius transformation to the corresponding isocyanate. General procedures are described by, for example, J. W. Boehmer in *Rec. Trav. Chim. Pays-Bas*, Volume 55, page 379 (1936) and C. F. H. Allen and A. Bell in *Organic Synthesis, Collected Volume* 3, 846 (1955).

Polyisocyanate homopolymers and copolymers useful in this invention are prepared from the corresponding monomeric isocyanate generally by an anionic polymerization process, which is described by Shashoua, et al., *J. Am. Chem. Soc.* Volume 81, page 3156 (1959) and *J. Am. Chem. Soc.* Vol. 82, page 866 (1960), hereby incorporated by reference.

In general, the polymerization procedure comprises adding a catalyst suspension of finely divided sodium cyanide in a liquid medium such as dimethylformamide, DMF, to a solution of isocyanate monomer or mixture thereof, in the same solvent used for the catalyst. The choice of solvent will vary depending on the particular isocyanate composition used. For difficultly soluble isocyanates, DMF is used. For readily soluble isocyanate toluene is used. For sparingly soluble isocyanates, a mixture of DMF and toluene is used. More specific information is given in Procedures B and C in the following Examples. The addition of catalyst suspension, as described above, is performed in the absence of moisture and oxygen, and is usually conducted at a temperature below about −50° C., over about a 30 minute period. After the addition, the resulting mixture is allowed to stir for about one hour and the polymerization reaction is then quenched by the addition of a cold (below −50° C.) soluble alcohol, such as methanol, and the resulting polyisocyanate collected, dried and characterized. Details of the preparation of specific liquid-crystalline polyisocyanates are given in the examples and preparation of other liquid-crystalline polyisocyanates, not specifically disclosed or described herein, are still within the scope of this invention and preparation thereof will be obvious to one skilled in the art from this disclosure.

The improved device of this invention for displaying indicia, performing memory functions or indicating temperature includes a liquid-crystal containing structure, a heat source or electrical field source, attached to said structure, wherein under the influence of applied heat or an electrical field on contact from said sources with said structure, the liquid-crystalline behavior of said liquid-crystal is induced which can be observed. The liquid-crystalline behavior results in the displaying of indicia, such as numerals and figures, performing of memory functions, such as storage of numerals and figures, or indicating temperature, such as reversibly indicating visual changes at a predetermined temperature in a calibrated thermometer device. Such devices are well known in the art with respect to design, construction and operation and for the sake of brevity will not be reiterated here. The device of this invention is novel in that it contains a new liquid-crystalline material for performing the above said functions, said liquid-crystalline material being a polyisocyanate homopolymer or copolymer.

Polyisocyanate homopolymers or copolymers useful in the improved invention device are fully and adequately described hereinabove. The improved device of this invention contains a liquid-crystal containing structure. By the term "liquid-crystal containing structure," is meant a structure formed from conventional materials containing said polyisocyanate in such a manner that the structure is able to function in a device for displaying indicia or performing memory functions, as disclosed in U.S. Pat. No. 3,935,337, hereby incorporated by reference. Such devices typically comprise a thin layer of liquid crystal sandwiched between two sheets of glass. Normally the thin layer of liquid-crystal material is clear, but when an electric field is applied to it, some portions or regions of the material become turbulent so as to scatter light. By controlling the size and shape of the turbulent regions, images can be formed. Primarily this affect is obtained by use of liquid-crystal materials of the nematic type. In a particular embodiment, the liquid-crystal material is sandwiched as a dielectric in a parallel plate capacitor with one transparent electrode and another electrode either transparent or reflecting. The liquid is kept between the electrodes by capillary action, since electrode spacings are the order of one mil. An applied dc or low frequency (less than 100 Hz.) field of more than 30,000 volts per centimeter changes the cell from transparent to turbulent in a few milliseconds producing an optical signal which can be in a predetermined form of several indicia, including numerals, letters and the like. Depending upon the particular liquid-crystal composition, the produced indicia may remain even after the field is removed. In other words, the optical signal may be maintained in the absence of applied power. The visual surface of the plate can be turned clear again by applying a high frequency (greater than 700 Hz) signal, thus erasing the indicia. The sample remains clear after the signal is removed and is ready for reuse.

Additional embodiments of liquid-crystal electro-optical devices are disclosed and illustrated in U.S. Pat. Nos. 3,401,262 and 3,410,999; *Proceedings of the IEEE,* Volume 56, No. 12 December 1968, pages 2146 to 2149; *The Glass Industry,* August 1968, pages 423 to 425; *Chemical and Engineering News,* Sept. 30, 1968, pages 32 and 33; *Physics Today,* July, 1970, pages 30 to 36; *Electronics,* July 6, 1970, pages 64 to 70 and U.S. Pat. No. 3,322,485 to Williams.

Liquid-crystal containing structures are also applicable in devices adapted for indicating and measuring temperature. Devices of this kind utilizing other types of liquid-crystals are well known in the art. The device can simply be a tab sandwiched in a plastic holder containing a liquid-crystalline polyisocyanate composition, chosen such that the desired temperature to be indicated or monitored is in the mesomorphic temperature range of the polyisocyanate wherein a contrasting color or other visual change occurs indicating that the particular temperature has been reached.

Preferred polyisocyanate polymers useful in the improved device of this invention are homopolymers of n-butyl isocyanate, n-hexyl isocyanate, n-octyl isocyanate, n-nonyl isocyanate, n-decenyl isocyanate, or copolymers of mixtures thereof.

Preferred polyisocyanate copolymers useful in the above device are copolymers of 3-(p-methoxyphenyl)-propyl isocyanate/n-butyl isocyanate, 3-(p-methoxyphenyl)propyl isocyanate/n-propyl isocyanate, 3-phenylpropyl isocyanate/n-butyl isocyanate, 3-phenyl propyl isocyanate/ethyl isocyanate, nonyl isocyanate/ethyl isocyanate, nonyl isocyanate/n-butyl isocyanate, or mixtures thereof.

The improved process of this invention for displaying indicia, performing memory functions or indicating temperature includes (a) applying heat or an electrical field to a liquid-crystal containing structure to induce liquid-crystalline behavior in said liquid crystal; and (b) observing said behavior, said steps being well known in the art and for the sake of brevity are not further elucidated here. The improvement in the invention process comprises providing a polyisocyanate homopolymer or copolymer, as the liquid crystal.

The polyisocyanate homopolymer or copolymer applicable in the improved invention process are described adequately hereinabove. The term "liquid-crystal containing structure," as used herein, is described and defined above. The step of providing the polyisocyanate homopolymer or copolymer to the liquid-crystal containing structure may be accomplished by conventional means such as melting the polyisocyanate to flow into the structure or pouring a solution of polyisocyanate, described hereinabove, into the structure. Other means not specifically disclosed will be obvious to one skilled in the art from this disclosure.

The following examples are illustrative of carrying out the best mode of the invention as contemplated by us and should not be considered to be limitations on the scope and spirit of the invention.

EXAMPLES

General Procedure (A) for Preparation of Isocyanate Monomers (a) Preparation of acid chlorides from free acids A carboxylic acid was mixed, in a round-bottomed flask under a dry atmosphere, with at least twice its molar amount of thionyl chloride and stirred at 35° C. to 40° C. for 3 hours, protected from moisture. The reaction mixture was then allowed to stand overnight at room temperature. Excess thionyl chloride in the reaction mixture was removed by gentle heating under reduced pressure to leave a residue of impure liquid acid chloride.

(b) Preparation of azides from acid chlorides (The quantities described below were proportionately used for each mole of acid chloride). Into a 3-neck flask were placed 1.5 moles of sodium azide ($NaN_3$), 300 ml of water and 300 ml of cyclohexane forming a two layer system, the aqueous layer being on the bottom. The contents were cooled by means of an ice bath and stirred to dissolve the sodium azide in the aqueous layer. A solution of acid chloride prepared above in (a), dissolved in 300 ml dry acetone, was added dropwise to the two layer system at such rate that the temperature of the two layer system did not exceed about 15° C. After the addition was completed, the flask was stirred at a temperature of about 10° C. to 15° C. for at least one additional hour. The resulting contents were cooled to about 0° C. and the formed organic azide was kept dissolved in cyclohexane solution by the addition of small increments of additional cyclohexane. The contents were transferred to a separatory funnel and the aqueous layer removed. The cyclohexane layer was maintained below 15° C. Traces of water, which tended to coalesce into droplets and to adhere to the glassware at this temperature, were removed by repeated decantation from one vessel to another.

(c) Preparation of isocyanates from azides

The cyclohexane solution of the organic azide prepared in (b) was added to twice its volume of boiling cyclohexane at such a rate that the temperature was maintained above 65° C., preferably at about 70° C., to aid in the conversion of the organic azide to isocyanate. After the addition was completed, the resulting solution was stirred at a temperature of about 60° to 70° C. for at least one additional hour. The resulting cyclohexane solution was then treated with decolorizing carbon and filtered. Then the solution was cooled, excess cyclohexane solvent removed by heating under reduced pressure, and the residual isocyanate purified by vacuum distillation. The purified isocyanate was protected from air, light and heat, until polymerized.

General Procedure (B) for Preparation of Catalyst for Polymerization

About 1 gram of finely ground dry sodium cyanide was suspended in 25 to 50 ml of dimethylformamide (previously dried over molecular sieves) in a glass vessel (previously flamed to remove moisture) under a dry nitrogen atmosphere. The resulting suspension was protected from moisture and stirred for at least one hour prior to use.

General Polymerization Procedure (C)

A three-necked flask, flamed to remove traces of moisture, and equipped with a dropping funnel, a mechanical stirrer, a dry nitrogen inlet and an outlet fitted with a drying tube, was the apparatus employed for the polymerization. The dropping funnel was filled with 10 ml or more of the catalyst suspension in DMF, prepared as described above in (B). Ten ml of a solution of isocyanate monomer prepared in (A), being a single monomer for homopolymerization, or a mixture of monomers for co-polymerization, and an additional 30 ml or more of solvent were added to the flask at room temperature. The composition of the solvent used depended on the particular isocyanate monomer. For very long aliphatic chains were n=18 to 12, toluene was preferably used. For intermediate length chains in the isocyanate monomer, where n=12 to 6, a mixture of 3:2 toluene/DMF was preferably used (wherein the solvent ratio of toluene/DMF was adjusted to 1:1 after the addition of the catalyst suspension). For short chain isocyanate monomers, wherein n=2 to 6, or for isocyanate monomers containing aromatic residues, DMF was preferably used. For convenience, the solvent system of choice was preferably a mixture of toluene and DMF in such proportions that after the addition of the catalyst suspension, the toluene/DMF ratio was about 1:1. The isocyanate monomer solution in the flask was cooled to a temperature below $-50°$ C., preferably about $-79°$ C., by means of a dry-ice/acetone bath. If the isocyanate monomer precipitated during cooling, additional solvent was added, and if the monomer remained frozen, then the temperature was raised several degrees by the use of a dry-ice-chloroform bath. After the solution was stabilized at the desired temperature, about 1 ml of the catalyst suspension was added from the addition funnel. More catalyst was added dropwise during the following 20 minutes. After a total of 30 minutes had passed, the reaction mixture was quenched by the addition of about 100 ml cold methanol (being the same temperature as the polymerization temperature, preferably about $-79°$ C.) The resultant mixture was stirred to break gel particles, and the resulting solid polymer was collected and washed several times with methanol and then dried under high vacuum at room temperature.

The following are specific examples of liquid-crystalline polyisocyanate homopolymers and copolymers prepared by the above-described procedures together with Comparative Examples.

EXAMPLE I

Normal octyl isocyanate, (b.p. 78° C. at 6 mm. pressure was prepared from nonanoic acid by Procedure A described above. It was then homopolymerized by Procedures B and C to yield poly(octyl isocyanate) of high molecular weight. (Solution viscosity determinations on 0.5% wt/vol. solutions in chloroform on several runs of the polymer yielded $\eta_{sp}/C$ values in the range of 2 to 7 deciliters/gram). The polymer demonstrated liquid-crystalline behavior (mesomorphic behavior) when studied in a polarized light microscope in TCE solution (1,1,2,2-tetrachloroethane) at concentrations of about 20% by weight or more of polymer. The liquid crystalline state was characterized by the appearance, under the microscope, of spherulitic entities with such an internal molecular orientation that polarized light became extinct in the directions of the polarizer and analyzer, resulting in dark "Maltese Crosses" dominating the appearance of the spherulites under the microscope. When studied neat, by means of hot stage microscopy, the polymer underwent a phase transition, from crystalline to liquid crystal, at about 118° C. The liquid-crystalline phase melted to produce an isotropic melt at 170°–175° C. The transition from the crystalline to the liquid-crystalline phase was observed to be reversible, even though it appeared as if the relaxation upon cooling was slower than the change upon heating. X-ray analysis revealed that the materials possessed a nematic liquid-crystalline structure, and also revealed a reversible transition at the temperature interval around 120° C. A sharp and prominent peak in the diffraction pattern corresponding to a "d spacing" of 20.52 Å at room temperature, was replaced by a similar peak at 16.2 Å when sample temperature was raised to 130° C. Upon cooling to room temperature and relaxing for two days, the original 20.52 Å peak reappeared.

EXAMPLE II

Normal hexyl isocyanate was prepared from heptanoic acid by Procedure A, and was polymerized by Procedures B and C. The resulting homopolymer exhibited liquid-crystalline behavior in solution in TCE at room temperature at concentrations of about 15 weight percent and above. Poly(hexyl isocyanate) behaved as a liquid crystal in the neat state in the temperature interval of 172° C. to 180° C. At 180°–181° C. the polymer melted completely forming an isotropic melt with the disappearance of all birefringent traces.

EXAMPLE III

9-Decenyl isocyanate was prepared from 10-undecenoic acid by Procedure A and polymerized by Procedures B and C. The resulting high molecular weight homopolymer ($\eta_{sp}/C$ in 0.5% solution in chloroform is 3.26 deciliter/gram) exhibited liquid-crystalline behavior in a concentrated solution of 15 weight percent in TCE at room temperature, and neat at elevated temperatures of 68° to 130° C.

EXAMPLE IV

Normal nonyl isocyanate was prepared from decanoic acid by Procedure A, and homopolymerized by Procedures B and C to yield high molecular weight poly(nonyl isocyanate), ($\eta_{sp}/C$ as a 0.5% solution in chloroform is 0.62 deciliters/gram.) The material exhibited liquid-crystalline behavior at room temperature in solution in TCE at concentrations above about 20% by volume. Thermal analysis revealed a transition at 56° C. above which the neat polymer is in a liquid crystal state and exhibits liquid-crystalline properties up to its melting point at ca. 160° C.

COMPARATIVE EXAMPLE I

Poly(methyl isocyanate), poly(n-butyl isocyanate), poly(octadecyl isocyanate), poly(pentadecyl isocyanate) and poly(tridecyl isocyanate), were prepared by Procedure C from corresponding monomers prepared by Procedures B and C. None of these derived polymers exhibited liquid-crystalline behavior neat or in solution at room temperature. However, poly(n-butyl isocyanate) exhibited liquid-crystalline behavior at about 100° C., in a 25 weight percent tetrachloroethane solution.

COMPARATIVE EXAMPLE II

All of the isocyanate monomers employed in Examples I through IV failed to show liquid-crystalline behavior either neat or as concentrated solutions in TCE.

COMPARATIVE EXAMPLE III 3-(p-Methoxy)phenylpropyl isocyanate was prepared from 4-(p-methoxy)phenylbutyric acid by Procedure A. The monomer was polymerized by Procedures B and C to yield a high molecular weight homopolymer, poly [3-(p-methoxy)phenylpropyl isocyanate]. The homopolymer exhibited no mesomorphic behavior.

EXAMPLE V 3-(p-Methoxy)phenylpropyl isocyanate was copolymerized with n-butyl isocyanate in different molar ratios. The resultant copolymers exhibited liquid-crystalline behavior over a broad range of copolymer composition. The molar ratios of the two monomers in the formed copolymers were measured from the integration curves of nuclear magnetic resonance (NMR) spectra of said copolymers in tetrachloroethane solution. It was found that all compositions in the range of 4:1 to 1:3 molar ratios of 3-(p-methoxy)phenylpropyl isocyanate to n-butyl isocyanate produced mesomorphic polymers, while copolymer compositions outside of this range did not exhibit liquid-crystalline behavior.

The copolymer formed from copolymerizing a 1:1 molar ratio of the two above isocyanate monomers, changed from a normal crystalline phase to a liquid-crystalline phase at about 165° C. The onset of melting was about 173° C. and the final melting point, where the melt is completely isotropic, occurred at 190°–193° C. In TCE solution at room temperature, the copolymer exhibited liquid-crystalline behavior over a concentration range at about 10% by weight and above.

Further, a copolymer formed from copolymerizing a 3:1 molar ratio of 3-(p-methoxy)phenylpropyl isocyanate to n-butyl isocyanate also exhibited liquid-crystalline behavior neat and in TCE solution, of about 10% by weight and above. The mesomorphic transition temperatures in the neat form are different, however, from those of the 1:1 copolymer. By contrast, in the 3:1 copolymer, the mesomorphic transition temperature occurred at 175° C., wherein the onset of melting occurred at about 180° C., and was complete at 194° C.

COMPARATIVE EXAMPLE IV 2-(p-Methoxyphenyl)ethyl isocyanate was prepared from 3-(p-methoxyphenyl)propionic acid; p-methoxybenzyl isocyanate from p-methoxyphenylacetic acid, and p-methoxyphenyl isocyanate from p-methoxybenzoic acid, by Procedure A. The monomers were individually homopolymerized, individually copolymerized with n-butyl isocyanate and copolymerized with one another in various molar ratios by Procedures B and C. In no case was there obtained a mesomorphic product exhibiting liquid-crystalline behavior.

EXAMPLE VI

3-Phenylpropyl isocyanate was prepared by Procedure A from 4-phenylbutyric acid. The monomer was homopolymerized by Procedures B and C. The resulting homopolymer did not exhibit liquid-crystalline behavior. However, copolymerization of 3-phenylpropyl isocyanate with n-butyl isocyanate, in molar ratios described in Example V, by Procedures B and C, yielded liquid-crystalline polymers, having mesomorphic transition temperature ranges of about 160° C. to 170° C. Molar ratios outside the range of 4:1 to 1:3, of the aryl-containing isocyanate to alkyl isocyanate, respectively, failed to produce mesomorphic materials.

EXAMPLE VII

3-Phenylpropyl isocyanate was copolymerized by Procedures B and C in about a 1:1 molar ratio with n-propyl isocyanate. The resultant copolymer exhibited liquid-crystalline behavior at about 160° C. and melted at about 170° C.

EXAMPLE VIII

3-Phenylpropyl isocyanate was copolymerized by Procedures B and C in about a 1:1 molar ratio with methyl isocyanate. The resultant copolymer exhibited liquid-crystalline behavior at about 160° C. and melted at about 165° C.

EXAMPLE IX 3-(p-Methoxyphenyl)propyl isocyanate was copolymerized by Procedures B and C with n-propyl isocyanate and separately with methyl isocyanate in about 1:1 molar ratios. The resulting high molecular weight copolymer derived from n-propylisocyanate exhibited liquid-crystalline behavior at about 160° C. and melted at about 170° C.; while the copolymer derived from methyl isocyanate exhibited liquid-crystallline behavior at about 160° C. and melted at about 165° C.

EXAMPLE X n-Nonyl isocyanate, prepared as in Example IV, was copolymerized with n-butyl isocyanate in about a 1:1 molar ratio by Procedures B and C to yield a high molecular weight copolymer. This copolymer exhibited liquid-crystalline behavior at about 120° C., and melted at about 160° C.

COMPARATIVE EXAMPLE V

2-Phenylethyl isocyanate was prepared by Procedure A from 3-phenylpropionic acid. It was homopolymerized by Procedures B and C to yield a high molecular weight polymer that did not exhibit liquid-crystalline behavior. When copolymerized with n-butyl isocyanate by Procedures B and C in about a 1:1 molar ratio, the resulting copolymer also did not exhibit liquid-crystalline behavior.

COMPARATIVE EXAMPLE VI

Benzyl isocyanate was prepared by Procedure A from phenylacetic acid. It was homopolymerized by Procedures B and C to yield a high molecular weight polymer that did not exhibit liquid-crystalline behavior. When copolymerized with n-butyl isocyanate by Procedures B and C in about a 1:1 molar ratio, the resulting copolymer also did not exhibit liquid-crystalline behavior.

COMPARATIVE EXAMPLE VII

Homopolymers formed from the aromatic isocyanate monomers: phenyl isocyanate, tolyl isocyanate, and p-methoxyphenyl isocyanate, wherein the aromatic residue is directly attached to the isocyanate residue, were polymerized by Procedures B and C. The resulting polymers did not exhibit liquid-crystalline behavior. Furthermore, X-ray studies revealed that these polymers tend to exist in amorphous structures, thus substantiating the idea that such aromatic polyisocyanates contain a polymer backbone that is not extended but tends toward a random conformation.

COMPARATIVE EXAMPLE VIII

Copolymerization of the aromatic isocyanate monomers described in Comparative Example VII with n-butyl isocyanate, in molar ratios of about 1:1, failed to produce copolymers exhibiting liquid-crystalline behavior.

COMPARATIVE EXAMPLE IX

Cyclohexylmethyl isocyanate, prepared by Procedure A from cyclohexylacetic acid, failed to homopolymerize by Procedures B and C. Cyclohexyl isocyanate also failed to homopolymerize by Procedures B and C. When either of these monomers was copolymerized with a short n-alkyl monomer such as n-butyl isocyanate, by Procedures B and C, a copolymer was obtained. The molar ratio of the contribution of n-butyl monomer to cyclohexyl monomer in the copolymer was significantly higher than the molar ratio of the monomers used in the copolymerization. In the case of cyclohexylmethyl isocyanate/n-butyl isocyanate, the comparative molar ratio in the polymerization was about 50:50 while in the formed copolymer therefrom, the molar ratio was about 23 numerical percent cyclohexylmethyl residues and 77 numerical percent n-butyl residues. From the inability of the pure cyclohexyl monomers to homopolymerize and from the smaller amount of the cyclohexylmethyl residue in the copolymer, apparently the bulky cyclohexyl residue interferes in the polymerization and that this steric hinderance is felt at distances of two carbon-carbon bonds, across the —$CH_2$— residue.

The resulting copolymers, containing cyclohexyl isocyanate or cyclohexylmethyl isocyanate, failed to exhibit liquid-crystalline behavior.

The products of the foregoing Examples, showing liquid-crystalline behavior, can be employed in known devices and processes using a liquid-crystal containing structure for displaying indicia, performing memory functions or indicating temperature as the liquid-crystal element in such device or process wherein the liquid-crystalline behavior is induced under the influence of heat or an electrical field.

We claim:

1. In a device for displaying indicia, performing memory functions or indicating temperature, comprising (1) a containing structure for liquid capable of liquid-crystalline behavior; (2) a heat source or electrical field source so positioned with reference to said structure, that under the influence of applied heat or an electrical field from said source, the liquid-crystalline behavior of said liquid is induced, said behavior resulting in the displaying of indicia, performing of memory functions, or indicating of temperature; and (3) a means for observing said behavior; the improvement which comprises providing as said liquid one from the group consisting of a liquid-crystalline polyisocyanate homopolymer or copolymer, liquid-crystalline solutions thereof, and liquid-crystalline solutions of a non-liquid-crystalline polyisocyanate homopolymer or copolymer; said homopolymer or copolymer consisting essentially of isocyanate units of formulae:

R—NCO, wherein R is
(1) linear $C_4$ or linear or branched $C_5$–$C_{12}$ alkyl, or substituted alkyl;
(2) linear $C_4$ or linear or branched $C_5$–$C_{12}$ terminal alkenyl, or substituted terminal alkenyl; said formulae including, for copolymers, an admixture of isocyanate units wherein R is of formulae (1) or (2), or mixture thereof, with isocyanate units of the formula:
(3) Ar—$(CH_2)_n$—NCO, wherein Ar is phenyl or substituted phenyl and n is an integer value of 3 to 4; or an admixture of isocyanate units wherein R is of formulae (1), (2) or (3), or mixture thereof, with isocyanate units of the formula:
(4) R—NCO, wherein R is linear $C_1$–$C_3$ alkyl or substituted alkyl; and in the above formula (1)-(4) inclusive, any substituents on R and Ar are inert under the polymerization conditions and do not adversely affect the liquid-crystalline behavior of said polyisocyanate, and the molar ratios of Ar-containing isocyante units to R-containing isocyanate units, in said copolymers thereof, are about 4:1 to 1:3.

2. The device of claim 1 wherein said polyisocyanate is a homopolymer of n-butyl isocyanate, n-hexyl isocyanate, n-octyl isocyanate, n-nonyl isocyanate, n-9-decenyl isocyanate, or copolymer of 3-p-methoxyphenylpropyl isocyanate/n-butyl isocyanate, 3-p-methoxyphenylpropyl isocyanate/n-propyl isocyanate, 3-phenylpropyl isocyanate/n-butyl isocyanate, 3-phenylpropyl isocyanate/ethyl isocyanate, nonyl isocyanate/ethyl isocyanate, nonyl isocyanate/butyl isocyanate, or mixtures thereof.

3. The device of claim 1 comprising a liquid-crystalline solution of polyisocyanate in a solvent therefor, wherein said solution contains about 5 to 35 weight percent polyisocyanate therein and wherein said solvent is $C_6$–$C_{10}$ aromatic hydrocarbon, halogenated $C_1$–$C_{14}$ saturated paraffinic hydrocarbon, $C_4$–$C_6$ cyclic saturated paraffinic hydrocarbon, or mixtures thereof.

4. The device of claim 3 wherein said solvent is benzene, toluene, chloroform, bromoform, 1,1,2,2-tetrachloroethane, tetrahydrofuran, or mixtures thereof.

5. In a process for displaying indicia, performing memory functions, or indicating temperature including
(a) applying heat or an electrical field to a structure containing liquid capable of liquid-crystalline behavior under the influence of heat or an electrical field; and
(b) observing said behavior; the improvement which comprises providing a, as the liquid, one selected from the group consisting of a liquid-crystalline polyisocyanate homopolymer or copolymer, liquid-crystalline solutions thereof, and liquid-crystalline solutions of a non-liquid-crystalline polyisocyanate homopolymer or copolymer; said homopolymer or copolymer consisting essentially of isocyanate units of formulae:

R—NCO, wherein R is
(1) linear $C_4$ or linear or branched $C_5$–$C_{12}$ alkyl, or substituted alkyl;
(2) linear $C_4$ or linear or branched $C_5$–$C_{12}$ terminal alkenyl, or substituted terminal alkenyl, said formulae including, for copolymers, an admixture of isocyanate units wherein R is of formulae (1) or (2), or mixture thereof, with isocyanate units of the formula:
(3) Ar—(CH$_2$)$_n$—NCO, wherein Ar is phenyl or substituted phenyl and n is an integer value of 3 to 5; or an admixture of isocyanate units wherein R is of formulae (1), (2) or (3), or mixture thereof, with isocyanate units of the formula:
(4) R—NCO, wherein R is linear C$_1$–C$_3$ alkyl, or substituted alkyl; and in the above formulae (1)–(4) inclusive, any substituents on R and Ar are inert under the polymerization conditions and do not adversely affect the liquid-crystalline behavior of said polyisocyanate, and the molar ratios of Ar-containing isocyanate units to R-containing isocyanate units, in said copolymer thereof, are about 4:1 to 1:3.

6. The process of claim 5 wherein said polyisocyanate is a homopolymer of n-butyl isocyanate, n-hexyl isocyanate, n-octyl isocyanate, n-nonyl isocyanate, n-9-decenyl isocyanate, or copolymer of 3-p-methoxyphenylpropyl isocyanate/n-butyl isocyanate, 3-p-methoxyphenylpropyl isocyanate/n-propyl isocyanate, 3-phenylpropyl isocyanate/n-butyl isocyanate, 3-phenylpropyl isocyanate/ethyl isocyanate, nonyl isocyanate/ethyl isocyanate, nonyl isocyanate/butyl isocyanate, or mixtures thereof.

7. The process of claim 5 comprising a liquid-crystalline solution a polyisocyanate in a solvent therefor, wherein said solution contains about 5 to 35 weight percent polyisocyanate therein and wherein said solvent is C$_6$–C$_{10}$ aromatic hydrocarbon, halogenated C$_1$–C$_4$ saturated paraffinic hydrocarbon, C$_4$–C$_6$ cyclic saturated paraffinic hydrocarbon, or mixtures thereof.

8. The process of claim 7 wherein said solvent is benzene, toluene, chloroform, bromoform, 1,1,2,2-tetrachloroethane, tetrahydrofuran or mixtures thereof.

* * * * *